Dec. 11, 1962 M. J. NOWLAN 3,068,326

MAGNETIC RECORDING AND REPRODUCING APPARATUS

Filed July 23, 1957

3 Sheets-Sheet 1

INVENTOR.
Michael J. Nowlan
BY Morris L. Rabkin
ATTORNEY.

INVENTOR.
Michael J. Nowlan
BY Morris [signature]
ATTORNEY.

Dec. 11, 1962 M. J. NOWLAN 3,068,326

MAGNETIC RECORDING AND REPRODUCING APPARATUS

Filed July 23, 1957

3 Sheets-Sheet 3

INVENTOR.

Michael J. Nowlan

BY

ATTORNEY.

United States Patent Office 3,068,326
Patented Dec. 11, 1962

3,068,326
MAGNETIC RECORDING AND REPRODUCING APPARATUS

Michael J. Nowlan, Audubon, N.J., assignor to Radio Corporation of America, a corporation of Delaware
Filed July 23, 1957, Ser. No. 673,663
8 Claims. (Cl. 179—100.2)

The present invention relates to magnetic recording and reproducing apparatus, and particularly to stereophonic sound systems incorporating magnetic recording and reproducing apparatus.

A pair of side-by-side tracks on a magnetic tape record may be used for carrying the two signals required to achieve the stereophonic sound effect. Equipment for reproducing the signals recorded on the tape has two channels for independent playback of each of the stereophonic sound signals. These channels are normally referred to as the right channel and the left channel, since the right ear and the left ear of the listener are intended to respond to the sound from different ones of the channels. The elements in the right and left channels are usually amplifier stages for driving loudspeakers.

In accordance with the present invention, additional components are incorporated in combination with the elements of the right and left channels of apparatus for reproducing stereophonic sound from magnetic records to provide a versatile, novel instrument. This instrument is capable of providing many operational functions in addition to stereophonic sound reproduction by utilizing the existing elements in both channels of the stereophonic sound apparatus. For example, features of the novel instrument are in provisions for monaural recording and for monaural reproduction with high fidelity. Stereophonic magnetic recording may also be provided.

It is well understood that, in order to record with high fidelity on a magnetic record, a recording bias signal, such as may be at supersonic frequency, is applied together with the signal to be recorded to the magnetic recording transducer. These transducers are normally referred to as magnetic heads. The present invention, in accordance with an embodiment thereof, includes means for utilizing portions of one of the channels of stereophonic sound apparatus for producing the requisite recording bias signals. Each channel of the stereophonic apparatus may comprise a pre-amplifier adapted, on playback, to be connected to a magnetic head for scanning one of the pair of record tracks which carry the stereophonically recorded signals and a plurality of cascade connected audio amplifiers. One of these audio amplifiers may drive an associated loudspeaker. Switching means are provided for enabling the stereophonic apparatus to be utilized as a magnetic recorder by connecting the output of one of the channels to drive a magnetic head instead of the loudspeaker. These switching means are also connected to the loudspeaker driving amplifier of the other channel to connect this amplifier as an oscillator capable of producing recording bias signals. Thus a novel instrument, featuring magnetic recording as well as stereophonic sound reproduction, is provided by the invention.

It is an object of the present invention to provide a novel instrument for magnetic recording and reproduction which may be conditioned for a greater variety of recording and playback functions than possible with similar equipment heretofore available.

It is a further object of the present invention to provide a novel magnetic recording and reproduction instrument incorporating a pair of channels adapted to operate with stereophonic sound signals which makes optimum utilization of these channels to provide a large number of different magnetic recording and reproduction functions.

It is still a further object of the present invention to provide a novel instrument for magnetic recording and reproduction having a pair of amplifier channels for carrying stereophonic sound signals and switching means interrelated with said channels for conditioning the channels to perform many different operations whereby the instrument is capable of providing a greater number of operating functions than heretofore available with such instruments.

The foregoing and other objects and advantages of the present invention will be better understood from a reading of the following description in connection with the accompanying drawings in which.

Figure 1:
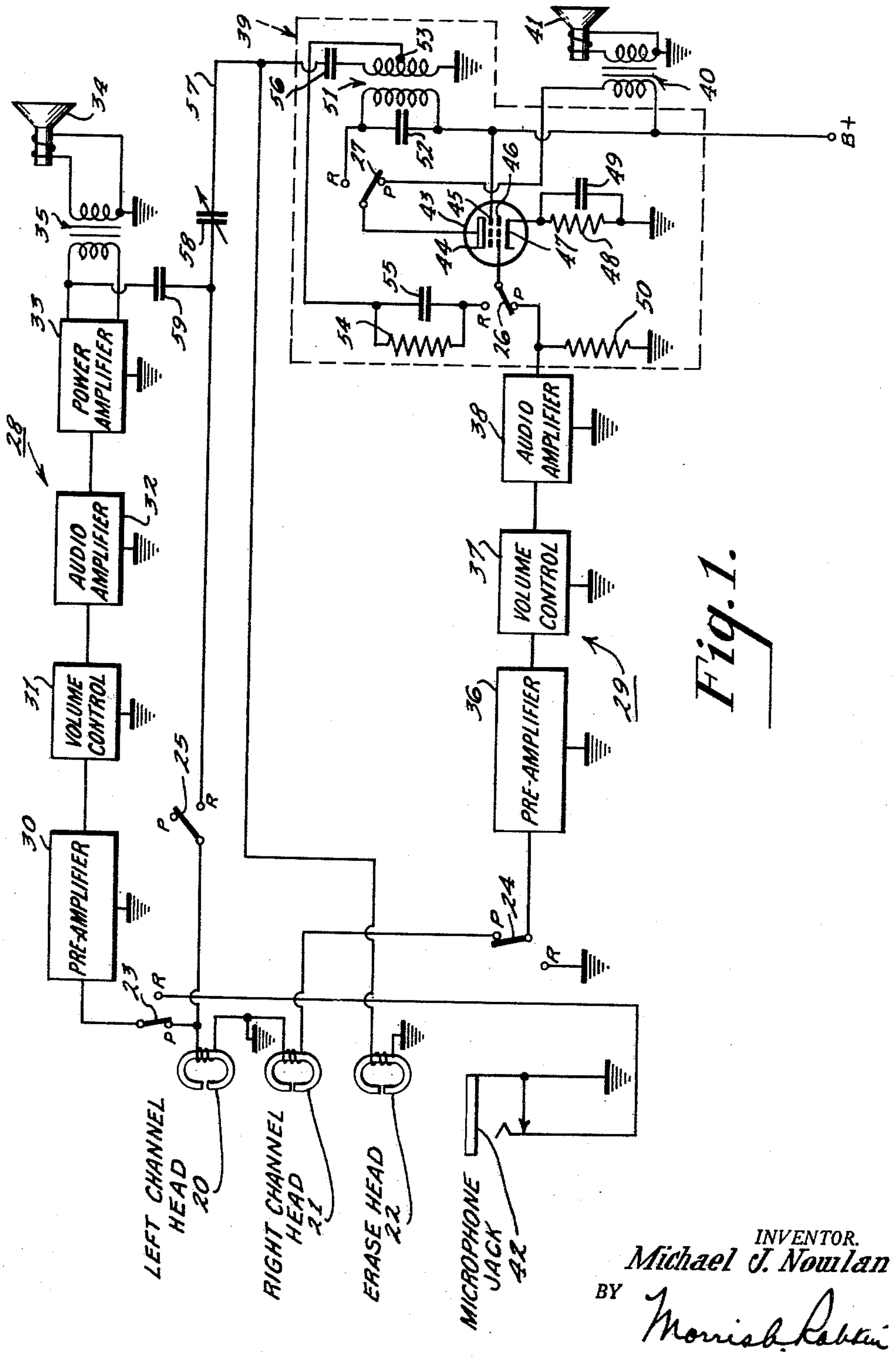
FIG. 1 is a schematic representation of a magnetic recording and reproducing instrument constructed in accordance with the invention.

Referring to FIG. 1 of the drawing, there is shown an electrical system for a magnetic recording and reproduction instrument constructed in accordance with the invention. The illustrated system may be incorporated in combination with the recording medium transport mechanism of the instrument, which transport mechanism may be conventional. Three magnetic heads 20, 21 and 22 in the illustrated electrical system may be mounted on the transport mechanism. The electrical system also includes a number of schematically illustrated switches 23, 24, 25, 26 and 27 which may be operated by means of controls mounted with the controls for the tape transport mechanism for ease of operation.

The magnetic recording medium with which the magnetic heads are adapted to cooperate, in the illustrated embodiments of the invention, may be magnetic tape of the type which is conventionally utilized for magnetic recording and reproduction. The tape is adapted to have a pair of side-by-side record tracks recorded thereon. Two of the magnetic heads 20 and 21 are adapted to scan different ones of these tracks. The heads are arranged vertically, one above the other. The head 20 may be disposed above the other head 21. The upper head 20 is referred to as the left channel head and the lower head 21 is referred to as the right channel head in accordance with the terminology being adopted in the art for stereophonic sound systems. The other head 22 is an erase head and may cooperate with either or both of the record tracks.

Two channels are provided for transmitting the signals from the magnetic heads 20 and 21. The left channel 28 is connected through the left channel input switch 23 to the ungrounded side of the coil in the head 20. The right channel 29 is adapted to transmit an appropriate signal which is stereophonically related to the signal recorded in the left channel. The right channel 29 is connected through a right channel input switch 24 to the ungrounded side of the coil in the right channel head 21.

The left channel 28 includes a preamplifier 30, a volume control 31, an audio amplifier 32 and a power amplifier 33. The amplifiers and volume control are connected in cascade with each other to amplify the signals picked up from the tape by the left channel head 20. Proper equalization networks are included in the amplifiers to compensate for the frequency response characteristics of the magnetic heads. A loudspeaker 34 is connected through an output transformer 35 to the output of the power amplifier 33. The right channel is substantially identical to the left channel, when the apparatus is operative to reproduce sounds stereophonically. The right channel 29 includes a preamplifier 36, volume control 37, audio amplifier 38, power amplifier 39, output transformer 40 and loudspeaker 41. The preamplifier 36, volume control 37, audio amplifier 38, output transformer 40 and loudspeaker 41 are similar to the corresponding elements in the left channel 28. The power amplifier 39, as will be brought out more fully hereinafter, may be similar to the power amplifier 33, when the instrument is conditioned for stereophonic reproduction.

A microphone jack 42 is provided to which a microphone (not shown) may be connected for applying signals to be recorded on the magnetic tape with the instrument. This microphone jack is connected to a terminal R of the left channel input switch 23. It will be appreciated that, for recording, a recording bias signal which is higher in frequency than the frequency of the signals to be recorded may be applied to the magnetic head together with the signals to be recorded. It may be found most suitable to use the uppermost of the heads 20 and 21 as a recording head. Thus, the left channel head 20 may be used for recording signals on the tape. The signals to be recorded as well as the signals providing recording bias are therefore applied to the left channel head 20, when the instrument is conditioned for recording.

In order to provide recording bias, one of the power amplifiers is connected by means of the switches to oscillate at supersonic frequency, such as about sixty-thousand cycles per second. In the illustrated system of FIG. 1, the power amplifier 39 in the right channel 29 is used to provide recording bias signals when the instruments is conditioned for recording. An oscillatory or feedback circuit is adapted to be connected between the input and output of the power amplifier 39 so that the amplifier 39 will provide the necessary recording bias signals.

The power amplifier 39 is shown in some detail in FIG. 1 of the drawings. This power amplifier stage incorporates a vacuum tube 43 having a plate 44, screen grid 45, control grid 46 and cathode 47 (the filament is not shown for purposes of simplifying the illustration). The control grid 46 may be considered to be connected to the input terminal of the amplifier, while the plate 44 is connected to the output terminal thereof. A source of operating voltage, conventionally illustrated at B+, is connected to the screen grid 45, and is connectable to the plate 44 for energizing the amplifier stage 39. A cathode bias circuit consisting of a resistor 48 and a shunt capacitor 49 is connected between the cathode 47 and ground. A grid resistor 50 is connected through the input switch 26 of the amplifier stage 39 to the grid 46 of the tube 43. The feedback circuit, which connects the amplifier stage 39 to operate as an oscillator of the Hartley type includes a pair of mutually coupled coils 51. One of these coils is shunted by a capacitor 52 to provide a tank circuit tuned to the desired frequency of the recording bias oscillations. A tap 53 on the other of the mutually coupled coils 51 is connected through a resistor 54, which is shunted by a capacitor 55, to a terminal on the input switch 26 of the amplifier stage 39. The one of the coils 51, which is tapped, functions as an output winding for supplying recording bias oscillations through a capacitor 56. The recording bias oscillations are used to energize the erase head 22. Therefore, the winding of the erase head 22 is connected to one side of the capacitor 56. A recording bias supply line 57 containing a small variable capacitor 58 is also connected to the output side of the capacitor 56.

The system is shown with all the switches, 23, 24, 25, 26 and 27, positioned to condition the apparatus for stereophonic reproduction. These switches 23, 24, 25, 26 and 27 may be connected together for ganged operation, and, as mentioned above, may be operated in coordination with the controls of the magnetic recording and reproduction instrument. For example, all of the switches 23, 24, 25, 26 and 27 may be biased mechanically by means of a spring or electrically with a solenoid into position for reproduction or playback. The fixed contacts of each of the switches 23, 24, 25, 26 and 27 are labelled with either the letter P or the letter R. The letter P represents the fixed contact which is contacted for playback or reproduction, and the letter R represents the fixed contact which is contacted for recording. The switches are normally biased so that the movable arm thereof is in contact with the fixed contact labelled P.

The right channel input switch 24 is adapted to connect the right channel 29 to the right channel head 21 or to disconnect the right channel from the head 21. The left channel input switch 23 may connect the left channel head 20 to the input of the left channel 28 or to the microphone jack 42. The output of the left channel; that is, the left channel power amplifier output, may be connected through a capacitor 59 and the switch 25 to the left channel head 20. Alternatively, the left channel power amplifier output may be disconnected from the left channel head. The input of the right channel power amplifier stage 39 is normally connected to the right channel audio amplifier 38 output. Alternatively, the input of the amplifier, that is, the grid 46 of the tube 43, may be connected to one end of the feedback circuit. The amplifier 39 output may be connected either to the loudspeaker 41 by way of the output transformer 40 or to the other end of the feedback winding. It will be noted that, when the plate 44, which provides the output terminal for the amplifier 39, is connected to the feedback circuit, energizing voltage is applied thereto through one of the coils 51, whereas, when the plate 44 is connected to the loudspeaker 41, it is energized through the primary of the output transformer 40.

When normally conditioned for stereophonic sound reproduction, the input of each channel is connected to the heads 20 and 21. The power amplifier 39 in the right channel 29 is connected as an amplifier and drives the loudspeaker 41. Thus, for playback operation, both power amplifiers 33 and 39 in the left channel 28 and right channel 29, respectively, operate in a similar manner. When the instrument is conditioned for recording by positioning the switches 23, 24, 25, 26 and 27 simultaneously in record position, the input of the right channel is grounded. The feedback circuit is connected between the input and output of the right channel power amplifier 39 so that this amplifier operates as an oscillator for producing recording bias signals. In the case of the left channel, the microphone, which may be connected to the microphone jack 42, supplies signals to the preamplifier 30 input through the right channel input switch 23. The signals to be recorded are amplified and are supplied from the power amplifier 33 through the capacitor 59 and the recording switch 25 to the left channel head 20. Simultaneously recording bias signals are applied through the capacitor 58. The capacitance of the capacitor 58 is small so that signals to be recorded do not pass into the power amplifier stage 39 of the right channel. Substantially all of the signals to be recorded are applied to the head 20 together with the recording bias oscillations.

It will be noted that the erase head is energized only when the instrument is conditioned for recording. The erase head is positioned ahead of the scanning heads 20 and 21 so that the tape is erased before the recording is performed thereon. The loudspeaker 34 may be permitted to remain in the output circuit of the power amplifier to function as a monitor for the signals being recorded. However, it may be desirable to insert another switch, not shown, to disconnect this loudspeaker from the power amplifier 33 output. It is therefore observed that monaural recording may be accomplished in the same instrument in which stereophonic sound reproduction is possible. Maximum utilization is made of the existing facilities of the stereophonic sound system. Moreover, the instrument may easily be conditioned for recording by actuating a simple switch control. Thus, an additional operating feature is provided in a convenient and useful manner.

Figure 2:
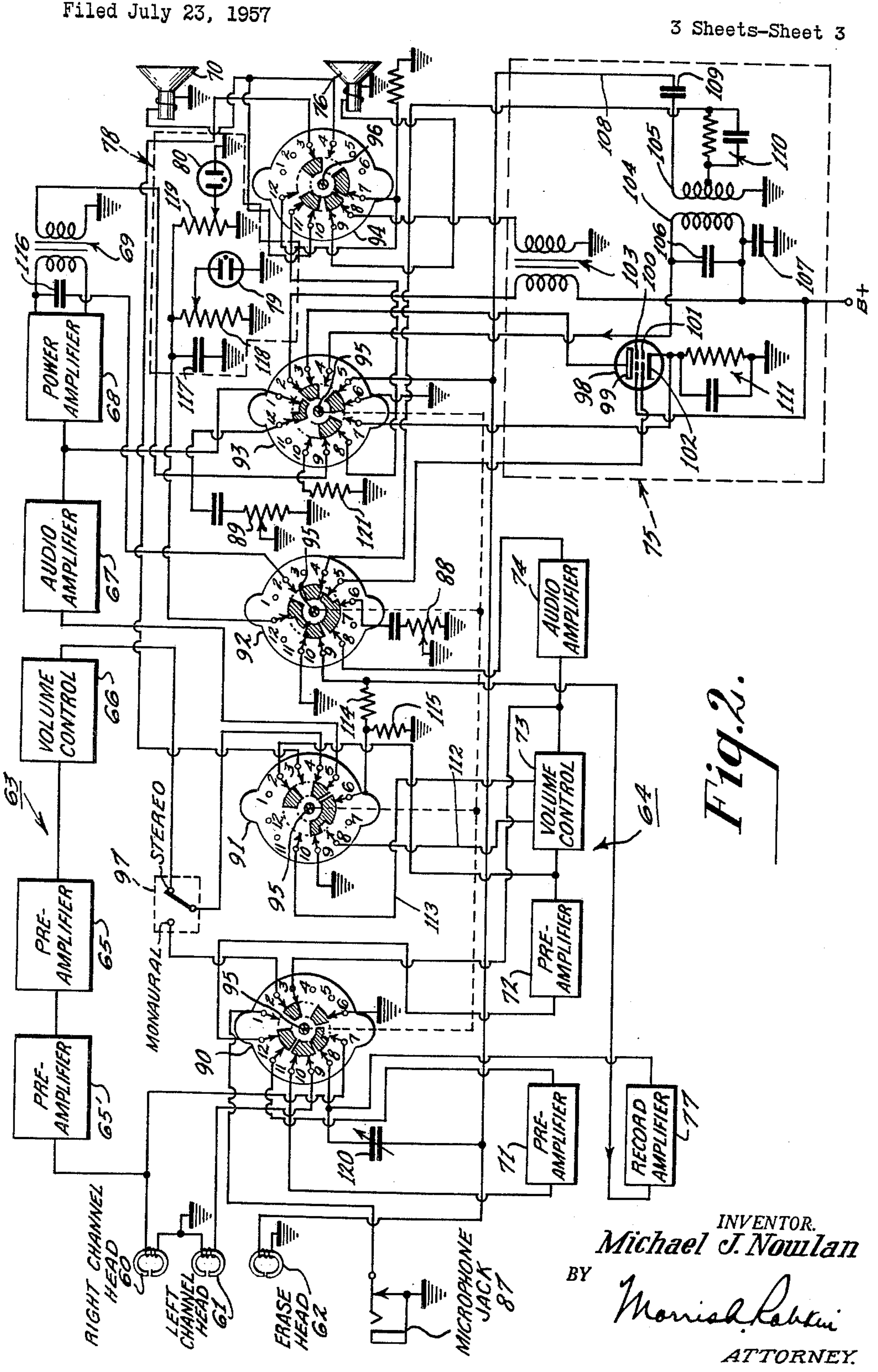
FIG. 2 is a schematic representation of a magnetic recording and reproducing instrument constructed in accordance with the invention, showing in some detail many of the features thereof.

Referring now to FIG. 2 of the drawings, a schematic diagram of a system for use in magnetic recording and reproducing apparatus is shown. An instrument incorporating the system illustrated in FIG. 2 provides still further operating functions than obtainable in the system illustrated in FIG. 1. Thus, a still more versatile magnetic recording and reproducing instrument may be provided in accordance with the present invention. Three magnetic heads 60, 61 and 62 are used. Two of these heads 60 and 61 are adapted to scan one or the other of two record tracks on a magnetic tape for recording or for reproducing record signals already recorded on the tape. The other head 62 serves as an erasing head. One of the heads 60 cooperates with the right channel of a signal transmitting system while the other head 61 cooperates with the left channel. Consequently, these heads are labelled right channel head and left channel head on the drawing. It is desirable that the left channel head be disposed to scan the upper one of the two record tracks on the tape, since it is desirable to use the upper one of the record tracks when a single of two stereophonically related signals are to be recorded or reproduced. The upper track on the tape is selected for single track recording and reproduction since, in many other tape recorders, the upper track is active upon recording and reproduction and it is desirable to adhere to a common standard.

A right channel 63 for transmitting right channel signals is connected at the channel input to the ungrounded side of the winding of the right channel head 60. A left channel 64 is connectable to the left channel head 61. The manner of connection between the left channel 64 and its associated head 61 is provided by switch means to be described in detail hereinafter.

The right channel 63 may include a pair of preamplifiers 65' and 65 which are connected in cascade with each other. The second preamplifier 65 is connected to a volume control 66. The volume control 66 may be frequency compensated by means of a combination of shunt resistors and capacitors. The right channel 63 also includes an audio amplifier 67 and a power amplifier 68. The output of the power amplifier 68 is connected to an output transformer 69. A loudspeaker 70 for the right channel is also provided. Some of the elements of the right channel 63 are connected together in a selective manner by the switches to be described in detail later.

The left channel 64 includes a preamplifier 71 and another preamplifier 72 which are similar to the preamplifiers 65' and 65, respectively, in the right channel 63. The output of the preamplifier 72 is connected to a volume control 73 which, in turn, is connected to an audio amplifier 74. The output of the audio amplifier is connected to a power amplifier 75; the power amplifier being shown in somewhat greater detail than the audio amplifier 74 and enclosed within the dashed lines. A loudspeaker 76 for the left channel 64 is also provided.

A jack 87 for the insertion of a microphone which supplies signals to be recorded on the tape is used together with a record amplifier 77 and a neon tube level indicator 78 shown enclosed by dashed lines in FIG. 2. The record amplifier may contain suitable networks to provide for frequency compensation of the signals to be recorded. The neon tube level indicator 78 includes a pair of neon tubes 79 and 80 which indicate when the recording level; that is, the amplitude of the signal being recorded, is normal or is overloading the recording head. The various elements of the left channel 64, as well as the microphone jack 87, the record amplifier 77 and the neon tube level indicator 78, are differently connected to each other when different operational functions, such as recording and stereophonic reproduction, are desired. There are also other elements, such as tone controls 88 and 89 consisting of series connected resistors and capacitors, which may be included in the right channel 63 and in the left channel 64 by appropriate operation of the switches.

In order to provide the several operational functions of the instrument and system provided by the present invention, a plurality of switches 90, 91, 92, 93 and 94 is used. Each of the switches 90 to 94 is a conventional twelve contact wafer switch. The contacts are numbered 1 to 12, consecutively, in a clockwise sense around each of the switches. Four of the switches 90 to 93 are ganged together, as for example, by being stacked on a common shaft 95 operated by a knob or push-button. The other switch 94 may be independently operated by rotating its own shaft 96. The switches are shown as positioned for playback operation. The switches may be normally biased in this position, as for example, by means of the spring. In order to provide for recording operation the switches may be advanced one step in the clockwise direction; that is, the contacts of the switches, which are movable by rotation of the shafts 95 or 96, may be angularly displaced in the clockwise sense by an amount equal to the angular displacement between two adjacent fixed contacts. Thus, the movable contacts which are in contact with the fixed contacts numbered 12 for playback operation are advanced in a clockwise sense by an amount sufficient to be contacted by the fixed contacts numbered 1; similarly, the moving contact which is contacted by the fixed contact numbered 1 on playback will be advanced sufficiently to be contacted by the fixed contact numbered 2 for recording, and so on. Another switch 97 which is labelled monaural-stereo on opposite sides thereof, is connected between the contact numbered 2 on the wafer switch 90 and the volume control 66 and audio amplifier 67 on the right channel 63. This switch 97 controls the operation of the instrument to provide for either stereophonic or monaural reproduction of the signal recorded on the tape, when the switches 90 to 94 condition the instrument for playback operation.

In order to record information on a magnetic recording medium, such as a magnetic tape, it is conventional to apply a high frequency recording bias signal to the recording head together with the signal to be recorded. The signals to be recorded are usually in the audio frequency range and are not appreciably higher than fifteen thousand cycles per second. It is desirable that the recording bias signals be at supersonic or ultrasonic frequencies, such for example as sixty thousand cycles per second.

In accordance with the present invention, one of the power amplifiers in one of the signal channels 63 or 64 is utilized as an oscillator to provide recording bias signals, when the instrument is conditioned for recording operation. For purposes of illustration, the drawing shows the power amplifier 75 in the left channel 64 to be used for providing recording bias signals. This power amplifier 75 is similar to the power amplifier 39 shown in the right channel 29 of the system illustrated in FIG. 1 of the drawing. It contains a multi-electrode tube 98 having screen grid 100, control grid 101 and cathode 102 electrodes. The control grid 101, which constitutes the input terminal of the amplifier 75, is connectable to the output of the audio amplifier 74. The plate 99 is connectable, either to the primary winding of an output transformer 103, or to one end of a feedback circuit by means of which the tube 98 may be connected as an oscillator. The feedback circuit includes a pair of mutually coupled coils 104, 105, one of which, 104, is shunted by a capacitor 106 to provide a tuned tank circuit. A much larger capacitor 107 connects the coil 104 and capacitor 106 to ground. The other coil 105 has one end thereof connected to ground and the other end thereof connected through a capacitor 109 to an output line 108 which carries the high frequency bias signals. The coil 105 is tapped. A shunt connected resistor and capacitor 110 is connected to the tap and is also connectable to the grid 101 of the tube 98. It will be observed, that, when the feedback circuit is connected between the plate 99 and the grid 101, the amplifier 75 will be connected in a manner similar to a Hartley oscillator. The cathode 102 of the tube 98 can be connected to ground directly or through a cathode bias circuit 111.

When the system is conditioned for playback operation, these switches 90 to 95 are disposed in the position indicated in the drawing. The right channel head 60 is connected to the input of the right channel; that is, the input of the preamplifier 65'. The output of the preamplifier 65 is applied through the volume control 66 and the contacts of the monaural-stereo switch 97, which is positioned for stereo reproduction, to the input of the audio amplifier 67. The output of the audio amplifier 67 is applied to the input of the power amplifier 68. The tone control 89 is connected, through the contacts numbered 12 and 1 of the wafer switch section 93, to the line connecting the output of the audio amplifier 67 to the input of the power amplifier 68. Therefore, the tone control 89 may be adjusted by means of varying the position of the movable arm of the potentiometer element thereof to adjust the frequency characteristic of the signal transmitted by the right channel, as suits the listener. The output of the power amplifier 68 is fed through the output transformer 69. The right channel loudspeaker 70 is connected to contacts numbered 10 and 11 of the wafer switch section 94 and the contacts numbered 8 and 9 of the wafer switch section 93, to the output winding of the transformer 69.

The left channel 64 is connected to provide a signal transmission channel similar to the right channel 63 for the stereophonic signals derived from the magnetic tape by the left channel head 61. The left channel head 61 is connected through the switch contacts numbered 9 and 10 of the wafer switch section 90 to the first preamplifier 71. The output of the first preamplifier 71 is connected through the contacts numbered 11 and 12 of the wafer switch section 90 to the input of the second preamplifier 72. The output of the second preamplifier 72 is applied directly to the volume control 73.

The volume control is of the frequency compensated variety so that it does not have an effect on the response of the amplifier immediately preceding and following it. It is desirable, for recording operation, to eliminate some of the frequency compensation circuitry from the volume control 73. This is accomplished by means of the wafer switch section 91 which places a short circuit across some of the compensating capacitors for recording operations. Leads 112 and 113 to the wafer switch section 91 are provided for this purpose.

The output of the volume control 73 is applied to the audio amplifier 74 from which the signal is carried between the contacts numbered 5 and 8 of the wafer switch section 92 to the input terminal of the power amplifier 75. The other tone control circuit 88 is connected to the contact numbered 6 of the wafer switch section 92 and is therefore effective to control the tone of the signal transmitted by the left channel 64, when the wafer switch section 92 is disposed in playback position.

For playbcak operation, the feedback circuit is not connected to the tube 98 in the power amplifier 75. Instead, the plate 99 of the tube 98 is connected through the contacts numbered 2 and 3 of the wafer switch section 93 to the primary of the output transformer 103. A source of operating voltage for the amplifier stage 75, conventionally illustrated at B+, is connected to the plate 99 through the primary winding of the transformer 103, and the contacts numbered 2 and 3 of the wafer switch section 93. Operating voltage from the source B+ is also directly connected to the screen grid 100. The output transformer 103 is connected to the left channel speaker 76 by means of the contacts numbered 8 and 9 of the wafer switch section 94. Thus, for stereophonic reproduction, both channels 63 and 64 are equally effective in amplifying the signals to be reproduced over the loudspeakers 70 and 76. The tone of the signals passing through each of the channels may be individually controlled or the controls 88 and 89 may be ganged so that the tone of the signals may be controlled simultaneously.

It may be desirable to reproduce only one of the two stereophonically recorded record tracks. Alternatively, only one record track may have signals recorded thereon, such for example, if the magnetic tape were recorded on a conventional magnetic recording and reproducing apparatus which is not designed for stereophonic sound reproduction or recording. When it is desired to play back only one of the two stereophonically recorded record tracks or a single record track which has been recorded in the conventional manner, the monaural-stereo switch 97 may be positioned for monaural reproduction; that is, the movable pole of the switch 97 may be shifted to the fixed contact thereof which is connected to the contact numbered 2 on the wafer switch section 90. With the monaural-stereo switch 97 positioned for monaural reproduction, the volume control 66 is disconnected from the audio amplifier 67 in the right channel 63. Signals derived from the tape by the left channel head 61 are transmitted, as was the case for stereophonic reproduction, through the preamplifiers 71 and 72 in the left channel and through the volume control 73. The output of the volume control is connected to the input of the audio amplifier 74 and the left channel output signals are amplified by the amplifier 75 and applied to the left channel loudspeaker 76, again as was the case for stereophonic reproduction.

A connection is provided between the contact numbered 3 on the wafer switch section 90 and the output of the volume control 73 in the left channel 64. This contact numbered 3 is connected through a movable contact of the wafer switch section 90 to the contact numbered 2 and then, through the monaural-stereo switch, to the input of the audio amplifier 67. Since the wafer switch sections 92, 94 are disposed in the same position for monaural reproduction as for stereophonic reproduction, the audio amplifier 67 and the power amplifier 68 in the right channel operate to drive the loudspeaker 70. Thus, both loudspeakers 70 and 76 are driven simultaneously with the same signal; that is, the signal picked up by the left channel head 61. The audio and power amplifiers 67, 68, 74 and 75 in the right channel and left channel, respectively, are simultaneously utilized to drive the loudspeakers 70 and 76. Since two loudspeakers, which may be positioned apart from each other are simultaneously used, the quality of reproduction, even for monaural signals, is enhanced.

An instrument provided by the present invention, which incorporates a system such as illustrated in FIG. 2 of the drawing, is adapted to record a signal monaurally on the record track scanned by the left channel head 61. Thus, magnetic tapes, which are recorded on an instrument constructed in accordance with the present invention, may be reproduced on any conventional magnetic reproducing apparatus. A microphone is inserted in the microphone jack 87. As was mentioned heretofore, when the instrument is conditioned for recording operation, the wafer switch sections 90 to 94 are advanced one step in a clockwise sense. It therefore follows that the signals from the microphone jack 87 will be carried by way of the contacts numbered 1 and 12 on the wafer switch section 90 to the input of the preamplifier 72. From the output of the preamplifier 72, the signal passes through the volume control 73 to the input of the audio amplifier 74. It was pointed out above, that for recording operation some of the compensation networks in the volume control 73 may be short-circuited and thereby connected out of operation by means of the leads 112 and 113. These leads 112 and 113 are connected, respectively, to the contacts numbered 8 and 10 of the wafer switch section 91; which contacts are connected to ground through the contact numbered 9, when the wafer switch section 91 is disposed in record position.

The output of the volume control 73 is applied to the input of the audio amplifier 74, which is connected through the contacts numbered 8 and 9 of the wafer switch section 92 to the input of the record amplifier 77. The record amplifier 77 is connected to the left channel head 61 through the contacts numbered 8 and 9 of the wafer switch section 90.

In accordance with the invention, the amplifiers 67 and 68 in the right channel 63, as well as the amplifier 75 in the left channel 64, are effective when the instrument is conditioned for recording as well as when the instrument is conditioned for reproduction. However, these amplifiers provide different functions for recording and for playback. For playback, the power amplifiers 68 and 75 in the right channel and left channel respectively are loudspeaker driving amplifiers, whereas, for recording, they function to provide recording bias signals and to drive recording level indicator devices. For purposes of illustration, the left channel power amplifier 75 is shown as being used to provide recording bias signals. The power amplifier 68 in the right channel is shown being used to operate the recording level indicating device. It may be desirable, in some cases, to use the right channel components for providing recording bias signals, when the instrument is conditioned for recording, and to use the left channel components to drive the recording level indicating devices. Either channel may be used in accordance with good engineering design considerations.

It is desirable to indicate the level or amplitude of the signals being recorded so that the operator of the instrument can adjust the level of the signals being recorded, as for example, by means of the volume control 73, to prevent overloading of the recording head and the consequent distortion of the recorded signals. To this end, a sample of the signal being recorded is derived from the output of the audio amplifier 74 through a voltage divider arrangement consisting of the resistors 114 and 115. The output of this voltage divider is connected by way of the contacts numbered 5 and 4 of the wafer switch section 91 and the contacts of the monaural-stereo switch 97 to the input of the audio amplifier 67 in the right channel. The sampled signals are amplified in the audio amplifier 67 and in the power amplifier 68. The output of the power amplifier 68 is connected to the neon tube level indicator device 78 by way of the contacts numbered 2 and 12 of the wafer switch section 92, and through a capacitor 116. The neon tube indicator comprises a capacitor 117 which is connected in series with the capacitor 116 across the output of the power amplifier 68. Potentiometers 118 and 119 are each connected across the capacitor 117. Neon tubes 79 and 80 are connected to the movable arm of the potentiometers 118 and 119, respectively. The neon tube 79 is connected to a point further above ground on a potentiometer 118 than the point on the potentiometer 119 to which the other neon tube 80 is connected. Since the tubes 79 and 80 are designed to fire at the same voltage, the tube 79 will fire before the tube 80. The potentiometers 118 and 119 are adjusted so that the tubes 79 will fire during normal operation and normal recording levels, whereas the tube 80 will only fire for overload levels. Neon tube indicators require high voltages for their operation. For example, as much as 60 volts may be necessary to fire a neon tube. Consequently, the amplifiers 67 and 68 in the right channel amplify the signals to be recorded without significant distortion of the signal so that the neon tube indicating device 78 will provide an accurate indication of the levels of the signals being recorded.

In order to increase the amplification of the power amplifier 68 when that amplifier is used to operate the level indicator 78, the characteristics of the amplifier are changed to make them suitable for the purpose by connecting a load resistor 121 across the secondary of the output transformer 69 by means of the contacts numbered 9 and 10 on the wafer switch section 93.

Together with the signals to be recorded, which are applied to the head 61 from the output of the record amplifier 67, there is applied a recording bias signal. This signal is available when the instrument is conditioned for recording operation at a recording bias supply lead 108. This lead 108 is connected through a small variable capacitor 120 and the contacts numbered 8 and 9 of the wafer switch section 90 to the left channel head 61. The recording bias lead 108 is also directly connected to the erase head 62. This erase head 62 is disposed ahead of the recording head 61 in the direction of travel of the magnetic tape so that the tape may be cleaned and erased before signals are recorded thereon. It will be observed that this erase head is energized only during recording operation. The power amplifier 75 is operative, when the instrument is conditioned for recording, to provide recording bias signals. The grid 101 of the tube 98 is disconnected from the output of the audio amplifier 74 and connected through the contacts numbered 5 and 4 of the wafer switch section 92 to the shunt connected resistor and capacitor 110 of the feedback circuit. The feedback circuit, it will be remembered, includes the mutually coupled coils 104 and 105, and the tank circuit provided by the coil 104 and the capacitor 106; which tank circuit is tuned to the desired frequency of the recording bias signals. This feedback circuit, and particularly the tank circuit thereof is connected through the contacts numbered 4 and 3 of the wafer switch section 93 to the plate 99 of the tube 98. The cathode 102 of the tube 98 is connected to ground through the contacts numbered 7 and 6 of the wafer switch section 93. The cathode bias circuit 111 is short-circuited when the instrument is conditioned for recording operation. Thus, the tube 98 is connected as a Hartley type oscillator which operates to provide oscillation for recording bias. The frequency of these oscillations may, for example, be about sixty thousand cycles per second.

Still another feature of the present invention which is illustrated in FIG. 2 is that a signal from a radio, television set, phonograph, and the like may be recorded directly, rather than by way of a microphone which is connected into the microphone jack 87. The speaker 70 which is used in the right channel 63 may be part of a radio, phonograph, television set, or the like. Ordinarily, when this speaker 70 is used, the radio, phonograph or television set is disconnected and inoperative. However, it may be desired to record the signals directly off the air. To this end, a connection is provided to the input of the volume control 73, when the instrument is conditioned for recording. This connection is through the contacts numbered 2 and 3 of the wafer switch section 91 which are connected to the contact numbered 3 of the wafer switch section 94. The contact numbered 4 of the wafer switch section 94 is connected to the voice coil of the loudspeaker 70. Ordinarily, in a radio, phonograph, television set or the like, the loudspeaker voice coil is also connected to the output of the audio amplifier incorporated in the set. Thus, when the wafer switch section 94 is disposed in recording position, the contacts numbered 3 and 4 thereof are connected and the audio output signals from the radio, phonograph or television set are connected to the input of the volume control 73 and may be recorded on the tape in the manner described above.

It will be observed from the foregoing that a plurality of different operating functions are provided in a single tape recording and reproducing instrument. Such functions are provided using a pair of channels for transmitting stereophonic sound signals without, however, interference or adverse effects because of the multiple use of different components of the channels. It will be appreciated that considerable savings of cost are effected and that the operation of the instrument is simplified by virtue of the integrated switching arrangement.

Figure 3:
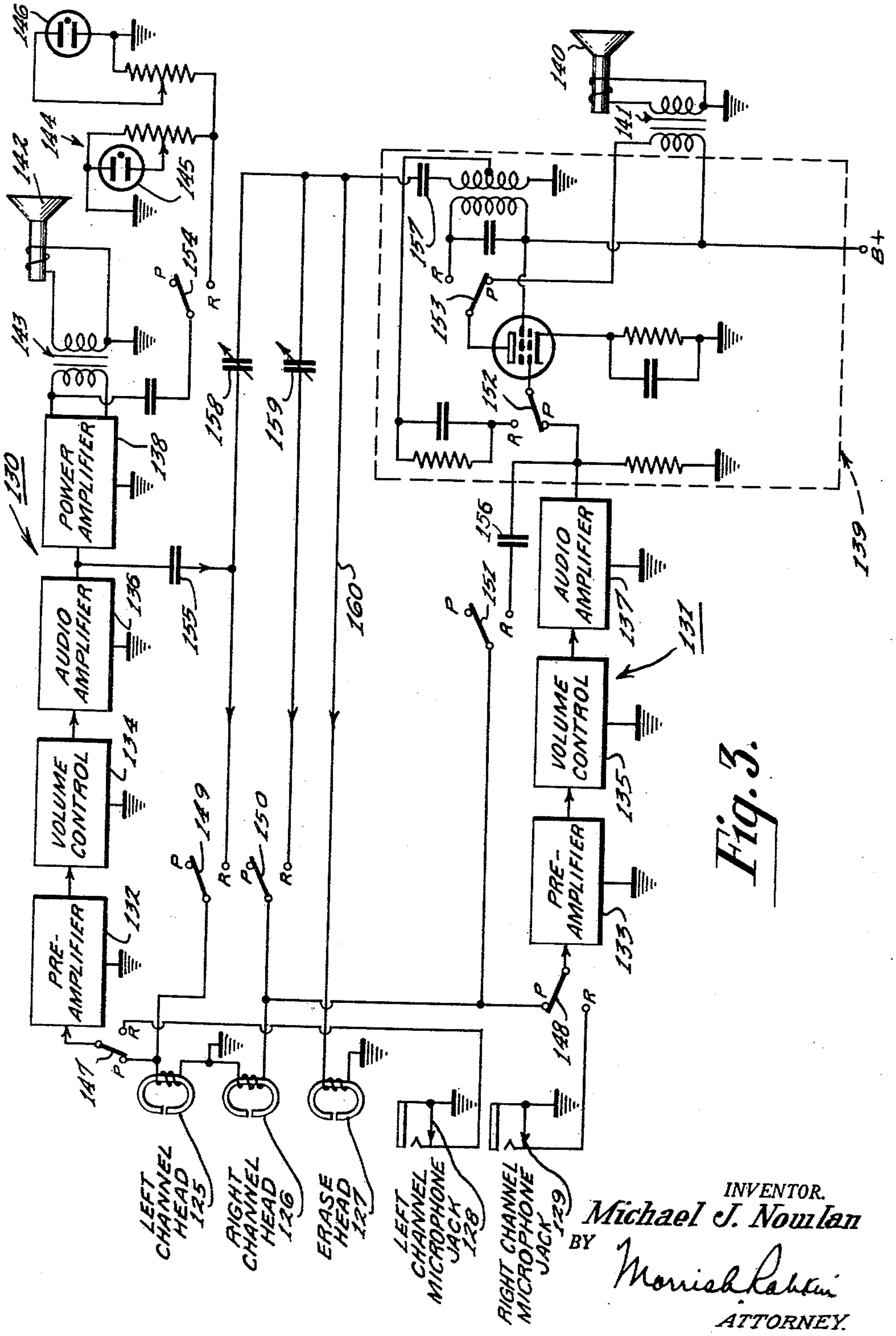
FIG. 3 is a schematic representation of a magnetic recording and reproducing instrument constructed in accordance with the invention showing still other features thereof than are shown in FIGS. 1 and 2.

The system illustrated in FIG. 3 may be used in a magnetic recording and reproducing instrument to provide for stereophonic recording as well as stereophonic reproduction. Three heads 125, 126 and 127 are used in the system illustrated in FIG. 3. One of these heads 125 serves as the left channel head while the other heads 126 and 127 serve as the right channel head and the erase head, respectively. A pair of microphone jacks 128 and 129 are provided in which microphones, which pick up sounds to be recorded in the left channel and in the right channel, may be inserted.

The left channel 130 and the right channel 131 are similar and include preamplifiers 132 and 133, volume controls 134, 135, audio amplifiers 136 and 137 and power amplifiers 138 and 139. The power amplifier 139 is shown in somewhat greater detail and is enclosed by the dashed lines. The right channel power amplifier 139 drives a right channel loudspeaker 140 through an output transformer 141. The power amplifier 138 in the left channel drives another loudspeaker 142 through an output transformer 143. The power amplifier 139 is substantially the same as the power amplifier 39 shown and described in connection with FIG. 1 and, therefore, the amplifier 139 will not be described in detail at this point. It includes a feedback circuit adapted to be connected between the input and output terminals thereof. When connected to the feedback circuit, the power amplifier functions as a Hartley type oscillator to provide oscillations for recording bias and erase purposes. A neon tube level indicator 144 which includes two neon tubes 145 and 146 is also provided for indicating the recording level. A plurality of switches are provided for conditioning the instrument for recording operation in one position thereof and for conditioning the instrument for playback operation in the other position thereof. These switches are designated by reference numerals 147 to 154 in the drawing and are shown as single pole double throw switches. This representation of the switches 147 to 154 is, however, only schematic and to facilitate the illustration of the invention. The switches may be ganged wafer switches of the type illustrated in FIG. 2, if desired. It may also be found suitable to bias the switches 147 to 154 so that they are ordinarily disposed in playback position. The fixed contact of each of the switches which are contacted by the movable pole thereof is designated by the letters P or R in accordance with the nomenclature previously adopted. All of the switches are shown in playback position. The poles are positioned in contact with the one of the fixed contacts designated by the letter R in order to condition the instrument for recording operation.

The magnetic heads 125 and 126 are operative to scan different ones of the record tracks on the magnetic tape in order to either record or reproduce signals on the tape. The erase head is positioned ahead of the left channel and right channel heads 125 and 126 in order to provide a clean tape for recording purposes. The left channel head 125 is connectable to the input of the preamplifier and to another point on the left channel at which amplified signals suitable for recording purposes may be obtained. Similarly, the right channel head 126 is connectable either to the input of the right channel 131 or to a point in the right channel at which signals are available which have been amplified so as to be suitable for recording. The power amplifiers 138 and 139 are connectable to drive the loudspeakers 142 and 140 respectively. The power amplifier 138 alternatively functions in combination with the recording level indicator 144 to indicate the level at which signals are recorded on the tape. The other power amplifier 139 is alternatively used to provide recording bias oscillations and is connectable with a feedback circuit, so as to operate as an oscillator. The microphone jacks 128 and 129 are also connectable to the input of the left channel and right channel 130 and 131, respectively, when the apparatus is conditioned for recording.

For playback operation, the left channel head 125 is connected, through the left channel input switch 147, to the input of the preamplifier 132 of the left channel 130. The left channel consists of the cascade connected volume control and the three amplifiers 134, 136 and 138 and functions to drive the loudspeaker 142 to reproduce the signals recorded on the one of the tracks which cooperates with the left channel head. Similarly, the right channel head 126 is connected, through the right channel input switch 148, to the input of the preamplifier 133 in the right channel 131.

When conditioned for playback operation, the power amplifier 139 is connected as a conventional audio amplifier. Consequently, signals transmitted over the right channel 131 are reproduced by the loudspeaker 140. Thus, when conditioned for playback operation, the stereophonic sound recorded on the tape is reproduced by the loudspeakers 140 and 142.

When conditioned for recording operation, all of the switches are simultaneously actuated and moved to record position. The ungrounded contact of the microphone jack 128 is connected, through the left channel input switch 147, to the left channel preamplifier 132 and is amplified therein. The signals to be recorded with the left channel head 125 are amplified in the left channel. The signals, in amplified form, which are available at the output of the audio amplifier 136, are transmitted through a capacitor 155 and the left channel output switch 149 to the left channel head 125 by means of which the signals may be recorded on the tape. Some of the signal output of the audio amplifier 136 is amplified in the power amplifier 138. The power amplifier 138 is connected through a switch 154 to energize the neon tube level indicator 144 so as to indicate normal operating and overload conditions in the same manner as the level indicator 78 described in connection with FIG. 2. The loudspeaker 142 is shown as being connected in this circuit. It may be desirable, however, to disconnect this loudspeaker and replace it by a load resistor to adjust the characteristics of the power amplifier 138 for driving the neon tube level indicator 144. Such a load resistor was used in the system illustrated in FIG. 2.

The right channel microphone is connected through a right channel input switch 148 to the preamplifier 133 in the right channel 131. The signal is amplified in the audio amplifier 137 of the right channel and applied through a condenser 156 and the right channel output switch 151 to the right channel head 126. The right channel head 126 may be used to record the signal on the tape. Thus, amplified signals are available for recording stereophonic sound on the tape. The microphones which are connected to the left and right channel jacks 128 and 129, respectively, may be disposed at spaced apart positions in accordance with conventional stereophonic recording techniques in order to pick up stereophonically related signals for recording on the tape.

With the switches 152 and 153 disposed in record position, the amplifier 139 is connected as a Hartley type oscillator. The amplifier then produces oscillations for recording bias. The output oscillations are transmitted through a capacitor 157 to two small variable capacitors 158, 159. Each of these capacitors 158 and 159 is connected to the output switches 149 and 150 for the left channel and right channel, respectively. Thus, the recording bias is combined with the signal to be recorded on the tape at the heads 125 and 126. Simultaneously, high frequency oscillations are applied over a lead 160 to the erase head 127 so that the erase head is energized and is operative when the instrument is conditioned for recording.

There has therefore been described an instrument for magnetic recording and reproduction which may provide for both stereophonic and monaural recording and reproduction. In addition, the instrument has features, such as means providing for recording level indicators, and for high fidelity monaural, dispersed sound reproduction and recording from any desired source including a microphone or off the air from a radio or television set. Other features, such as provisions for recording directly from the signal output of a radio, television set, phonograph or the like and provisions for dual channel monaural reproduction may be incorporated as suggested in connection with the system shown in FIG. 2.

What is claimed is:

1. In an instrument conditionable alternatively for magnetic sound recording and for sound reproduction in separate loudspeakers, said instrument having a pair of magnetic heads for scanning different tracks on a magnetic record medium, a stereophonic sound system comprising a pair of channels for transmitting signals to and from said heads, each of said channels including a separate amplifier, amplifiers each being adapted to drive different ones of said separate loudspeakers, first circuit means for cooperation with one of said amplifiers for indicating the signals applied to at least one of said magnetic heads, second circuit means cooperable with the other of said amplifiers for providing recording bias oscillations, and switching means for connecting said one amplifier to said first circuit means and said other amplifier to said second circuit means and to said one head when said instrument is conditioned for magnetic recording and for connecting said amplifiers to different ones of said separate loudspeakers when said instrument is conditioned for reproduction of signals recorded on said record medium.

2. In an instrument conditionable alternatively for magnetic recording of sound and reproduction of magnetically recorded sound in separate loudspeakers, said instrument having a pair of magnetic heads for scanning different record tracks on a magnetic tape record and another magnetic head for erasing said record, the combination comprising a plurality of amplifiers each having input and output terminals, two of said amplifiers arranged to individually drive different ones of said separate loudspeakers, first and second amplifier groups each containing equal numbers of said amplifiers including said loudspeaker driving amplifiers and the amplifiers of each group being connected in cascade, and said groups individually constituting a left transmission channel and a right transmission channel for reproduction of signals stereophonically recorded on said tape record, means for connecting the input terminal of one of said amplifiers in said left channel to one of said scanning heads, means for connecting the input terminal of one of said amplifiers in said right channel to the other of said scanning heads, means for applying a signal to be recorded to the input terminal of a selected one of said amplifiers in a selected one of said channels, said signal applying means and said input terminal connecting means including a multiple contact switch having contacts connected to the input terminals of said one amplifier and of said selected one amplifier, feed back circuit means including an inductance and a capacitance, said switch having different contacts connected to said feedback circuit means and the input and the output terminals of one of said loudspeaker driving amplifiers, means for connecting said erase head to said output terminal of said one loudspeaker driving amplifier, said switch having at least two operating positions: in one of said positions the input terminals of said one amplifiers in said left and right channels being connected to said scanning heads and said loudspeakers being connected each to a different one of said driving amplifiers to condition said instrument for stereophonic sound reproduction; and in the other of said positions said signal applying means being connected to the input terminal of a certain one of said amplifiers in one of said channels, said feedback circuit being connected between said input and output terminals of one loudspeaker driving amplifier, and said last-named output terminals being connected to said erase head to condition said instrument for recording.

3. In an instrument for magnetically recording signals and for reproducing magnetically recorded signals, said instrument having a pair of loudspeakers and a pair of magnetic heads adapted to cooperate simultaneously with different record tracks on a magnetic record medium, a stereophonic sound system comprising:

(*a*) a number of amplifiers including a final amplifier connected in cascade and providing a left signal channel for connection to one of said pair of heads and to one of said pair of loudspeakers, (*b*) a number of other cascade connected amplifiers including another final amplifier providing a right signal channel for connection to the other of said pair of heads and to the other of said pair of loudspeakers whereby said signal channels, heads and loudspeakers provide for stereophonic reproduction of signals recorded on said record tracks, (*c*) a level indicator device including a gaseous indicator tube, (*d*) a tank circuit, and (*e*) switch means for selectively conditioning said instrument for recording and for reproducing, (*f*) said switch means connecting said final amplifier to different ones of said loudspeakers for reproducing and said indicator device and tank circuit separately to different ones of said final amplifiers for recording, (*g*) said switch means including contact elements simultaneously operative, when said instrument is conditioned for recording, for connecting the one of said final amplifiers connected to said tank circuit to at least one of said magnetic heads for providing recording bias signals thereto, (*h*) said switch means also having other of said contact elements connected to said one head and to one of said channels for connecting said one channel to transmit signals to be recorded on said medium by said one head.

4. Magnetic recording and reproducing apparatus comprising left and right channels for reproducing in separate loudspeakers a pair of signals stereophonically recorded on a magnetic record medium, each of said channels separately including separate ones of a pair of magnetic heads and a plurality of amplifier stages, one of said stages being adapted to drive one of said separate loudspeakers for reproducing said signals, switching means for conditioning said apparatus alternatively for recording and playback operations, a plurality of connections from said switching means to said channels including at least one pair of connections to one of said loudspeaker drive stages, said switching means interconnecting said connections to said one loudspeaker drive stage when said apparatus is conditioned for recording to cause said one loudspeaker drive stage to provide oscillatory signals for recording bias, means to apply signals to be recorded to the input of one of said amplifier stages in one of said channels, one of said connections extending between said switching means and the output of another of said amplifier stages following said one amplifier stage to which said signals to be recorded are applied, said two last-named stages being in the same channel, and said switching means providing for the interconnection among the output of said following amplifier stage, said one loudspeaker drive stage and one of said heads.

5. A stereophonic sound system comprising a pair of channels for carrying stereophonic sound signals, each of said channels including (*a*) a magnetic head for cooperation with a magnetic record medium, (*b*) a plurality of amplifiers adapted to be connected in cascade, and (*c*) a loudspeaker, means including a circuit operable when connected to a certain one of said amplifiers in one of said channels for producing recording bias oscillations, switching means providing for at least two conditions of operation of said system including reproduction of signals stereophonically recorded on said medium and recording of other signals on said medium, said switching means being connected to said certain amplifier in one of said channels, one of said loudspeakers and one of said heads, said switching means establishing a connection between the output of said certain amplifier and said one loudspeaker for said reproduction condition of operation and establishing a connection between said certain amplifier and said circuit for said recording condition of operation, said switching means also establishing a connection between the output of another amplifier in a selected one of said channels, said certain amplifier and said one head for said recording condition of operation, and said other amplifier being connected to amplify said signals to be recorded.

6. Magnetic recording and reproducing apparatus for stereophonic reproduction of sound signals in separate loudspeakers comprising a pair of magnetic heads adapted to cooperate simultaneously with different record tracks on a magnetic record medium, a first channel for transmitting signals for use in one of said heads, a second channel for transmitting signals for use in the other of said heads, each of said channels including separate pluralities of amplifier stages including final amplifier stages which are connected in cascade, an input terminal connected to the first amplifier in each of said channels, an output terminal connected to the final amplifier in each of said channels, said final amplifier output terminals being individually connectable to said separate loudspeakers for stereophonic reproduction of said signals, switching means operative to provide at least two conditions of operation of said apparatus, one of said conditions being for the stereophonic reproduction of sound signals, the other of said conditions being for the recording of sound signals, circuit means for rendering an amplifier operative to provide oscillations of a frequency for recording bias, said switching means being connected to (*a*) said first channel final amplifier, (*b*) said first channel output terminal thereof, and (*c*) said circuit means, said switching means establishing a connection between said output terminal in said first channel and one of said loudspeakers for said reproduction condition and between said one final amplifier and said circuit means for said recording condition, said switching means also connecting said output terminal in said first channel to one of said magnetic heads for said recording condition, and means for applying signals to be recorded to one of said input terminals, said last-named means being connected to said switching means, one of said cascade connected amplifiers preceding said final amplifier in the same channel as said one input terminal having its output terminal connected to said switching means, said one input terminal being connected for said reproduction condition to one of said magnetic heads and for said recording condition to said signal applying means, said last-named output terminal being connected to one of said heads only for said recording condition of operation.

7. An instrument conditionable for stereophonically recording sound signals on magnetic tape and reproducing stereophonically recorded signals in a pair of loudspeakers, said instrument comprising a pair of signal transmission channels, each of said channels including a magnetic head and a plurality of amplifiers, one of said amplifiers being a loudspeaker driving amplifier for driving a separate one of said loudspeakers, circuit means connectable with one of said loudspeaker driving amplifiers to provide oscillations in cooperation therewith, indicator means for displaying the amplitude of a signal to be recorded, means connectable with the input of said channels for individually applying thereto signals to be recorded, and simultaneously operative switching means positionable for alternatively conditioning said instrument for recording and reproducing, said switching means connecting said magnetic heads individually to the inputs of different ones of said channels for stereophonic sound reproduction through said loudspeakers when said switching means is positioned for reproducing, said switching means connecting said circuit means and said indicator means to different ones of said loudspeaker driving amplifiers when said switching means is positioned for recording, said signal applying means being connected to said channel inputs and said heads being connected to the outputs of amplifiers in different ones of said channels upon positioning of said switching means for recording.

8. The instrument as defined in claim 7 wherein said switching means includes a plurality of wafer switch sections mounted for simultaneous actuation on a common shaft.

References Cited in the file of this patent

UNITED STATES PATENTS

| | | |
|---|---|---|
| 2,540,299 | Shoup et al. | Feb. 6, 1951 |
| 2,561,338 | Camras | July 24, 1951 |
| 2,563,545 | Moreland et al. | Aug. 7, 1951 |
| 2,654,003 | Dashiell | Sept. 29, 1953 |
| 2,810,791 | West et al. | Oct. 22, 1957 |
| 2,811,588 | Julie | Oct. 29, 1957 |
| 2,829,209 | Crain | Apr. 1, 1958 |

OTHER REFERENCES

Journal of the British Institution of Radio Engineers, February 1956, pages 65–79.